US009658926B1

(12) United States Patent
Kulkarni et al.

(10) Patent No.: US 9,658,926 B1
(45) Date of Patent: May 23, 2017

(54) SYSTEMS AND METHODS FOR DYNAMIC SAVE STREAMS

(71) Applicant: EMC Corporation, Hopkinton, MA (US)

(72) Inventors: Gururaj Kulkarni, Bangalore (IN); Yogesh Suresh, Bangalore (IN); Manjunatha Hebbar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 213 days.

(21) Appl. No.: 14/325,980

(22) Filed: Jul. 8, 2014

(51) Int. Cl.
*G06F 12/00* (2006.01)
*G06F 11/14* (2006.01)

(52) U.S. Cl.
CPC .................. *G06F 11/1458* (2013.01)

(58) Field of Classification Search
CPC .. G06F 12/00; G06F 11/1446; G06F 11/1448; G06F 11/1451; G06F 11/1458; G06F 11/1461; G06F 11/1464

USPC ................. 711/100, 154, 161, 162
See application file for complete search history.

(56) References Cited

U.S. PATENT DOCUMENTS

| 4,569,542 | A | * | 2/1986 | Anderson | ............... F16L 21/08 285/337 |
| 5,381,538 | A | * | 1/1995 | Amini | .................... G06F 13/28 392/483 |
| 5,673,381 | A | * | 9/1997 | Huai | ................... G06F 11/1464 711/162 |
| 7,937,369 | B1 | * | 5/2011 | Dings | ............... G06F 17/30174 707/652 |
| 9,323,759 | B1 | * | 4/2016 | Varrin | ............... G06F 17/30073 |
| 2008/0309166 | A1 | * | 12/2008 | Herbener | ................ H02J 9/066 307/64 |

* cited by examiner

*Primary Examiner* — Tuan Thai
(74) *Attorney, Agent, or Firm* — Workman Nydegger

(57) ABSTRACT

Systems and methods are provided for performing a backup operation in a computing system. The source data and associated hardware are assessed to determine an optimum read block size and an optimum number of backup streams. The source data is then backed up using the optimum number of backup streams at the optimum read block size.

17 Claims, 4 Drawing Sheets

SYSTEMS AND METHODS FOR DYNAMIC SAVE STREAMS

FIELD OF THE INVENTION

Embodiments of the present invention generally relate to data protection operations including backup operations. More particularly, embodiments of the invention relate to performing a backup operation with dynamic backup streams and to systems and methods for dynamically determining the backup streams during a backup operation.

BACKGROUND

Protecting data by backing up the data is an important aspect of many computing systems. Backup operations are typically run so that they do not interfere or so that they minimally interfere with the production operations of the computing system. This is not always easy to accomplish in part because of the ever increasing amount of data that needs to be backed up. Clients are continually seeking to have their data backed up in shorter time periods or shorter backup windows.

Some of these challenges can be addressed by upgrading the backup system to include the latest hardware. In addition, the bandwidth allocated to the backup operation can be increased. Some systems have considered the possibility of splitting the data being backed up into multiple streams. Surprisingly, splitting the backup data into multiple streams may adversely impact the performance of the backup system. This is due in part to the fact that simply establishing multiple data streams for the data may not be a best fit for the data and/or the underlying hardware. As a result, some clients are confused when multiple backup streams results in reduced backup performance. Systems and methods for backing up data using multiple streams in an intelligent and dynamic manner are needed.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
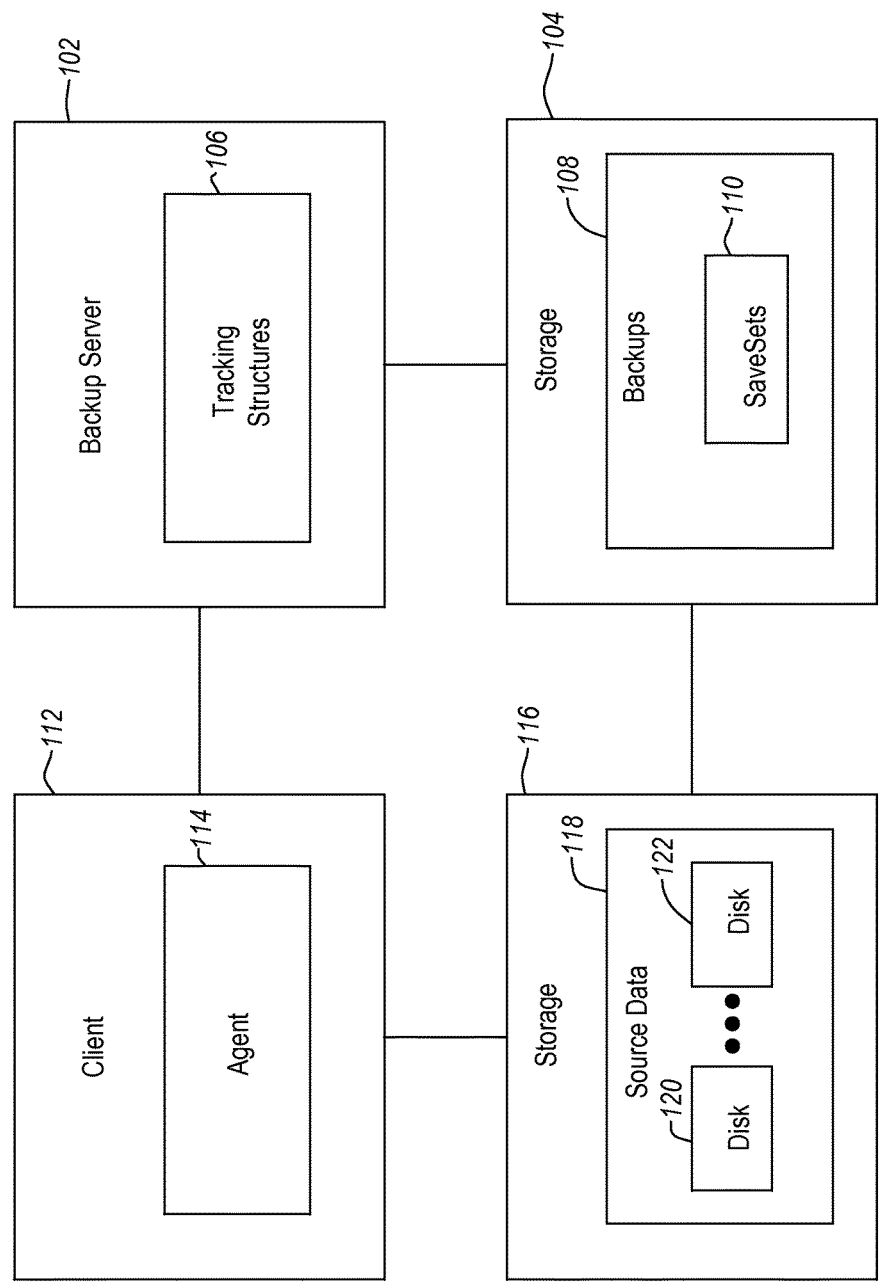
FIG. 1 illustrates an example of a backup system that can backup data using dynamically configured backup streams.

Embodiments of the invention generally relate to systems and methods for performing data protection operations such as backup operations in a computing environment or system. The amount of data in many computing systems continually grows and protecting the data can be complicated and challenging. In addition, there is a desire to perform backup operations more frequently or within a shorter backup window. Embodiments of the invention enable a backup window to be smaller while also allowing for data growth.

When performing a backup operation, embodiments dynamically split the data being backed up into one or more backup streams. Stated differently, the data is backed up by establishing multiple backup streams. The backup streams are directed to a storage device associated with a backup server. For a given saveset (an example of data to be backed up), a relationship between the data in the various backup streams is maintained such that the data being backed up can be successfully restored.

Dynamically splitting the data to be backed up into backup streams allows a higher net aggregate throughput by accounting for various characteristics of the data and/or the hardware on which the data is stored and/or transported. By increasing or optimizing the net throughput, the backup window may be reduced in size and may take less time compared, for example, to a conventional backup operation or to parallel backup streams that are static in nature. The higher net aggregate throughput may not be achieved, for example, using backup streams that are statically set.

Dynamically generated or configured backup streams allow a backup system to backup more data in a smaller amount of time. The data being backed up (referred to herein as source data and/or savesets) can be split into backup streams, in one example, according to an I/O factor and a concurrency factor. The I/O factor relates to the size of the data blocks that are read during the backup operation and the concurrency factor relates to the number of concurrent or parallel backup streams.

When dynamically splitting the source data into backup streams, the backup operation configures the backup streams to optimize the net aggregate throughput. Dynamically splitting the source data into backup streams can make effective use of the source data net aggregate throughput and avoid problems associated with streams that are static and that may be set without accounting for the source data or any hardware.

Embodiments of the invention provide systems and methods where the source data is assessed and the source data is split into backup streams dynamically. If the ability to backup data using concurrent or parallel streams is enabled in the backup system, embodiments of the invention may improve performance. The source data is split into backup streams, in one example, based on the best block size to read the source data and based on the number of concurrent I/O operations that optimize throughput as previously stated.

More specifically, the source data or a saveset included in the source data can be backed up using a number of backup streams whose characteristics or configurations are based on an assessment of the source data (e.g., an assessment of the data, the file system, the associated hardware, and/or the like). The assessment of the source data may be performed prior to performing the backup operation or may be conducted in the context of the backup operation.

The assessment of the source data may account for various factors. In one example, the source data is assessed based on a read block size and a number of concurrent reads or streams that can be performed using the read block size. The optimum read block size may be determined by performing sample read operations. The read block size may be gradually increased during this process. For example, the read block size may start, by way of example and not limitation, at 64 KB. The read block size may be increased for subsequent samples by a factor of two (e.g., 128 KB, 256 KB, 512 KB, 1 MB, 2 MB, 4 MB, 8 MB, or higher). The I/O time is determined for each read block size. For the backup operation, the read block size that provides the best performance (in terms of I/O time in one example) may be selected as the read block size used to read the source data during the backup operation. For example, the I/O time for a 4 MB read operation may be compared to the I/O time associated with four 1 MB read operation. This is an example of a comparison that could be used to determine the optimum read block size. This also illustrates that the optimum read block size may account for the specific device on which the source data is located and illustrates the benefits than can be obtained compared to a static configuration. It can be appreciated that the optimum read block size for two different devices may be different. As a result, the overall performance of the backup system can be improved by the dynamic configuration of the backup streams as discussed herein.

Next, a concurrency factor may be determined by simultaneously fetching the source data with the read block size that demonstrated the best throughput (e.g., I/O time) as previously described. This may be achieved by dynamically splitting the source data into a number of streams with the previously determined read block size until source net aggregate read throughput threshold limit is reached. The threshold of data throughput is determined based on when the source net aggregate throughput dips with additional splitting of the source data and concurrent reads.

In another example, the optimum read block size may be determined for where there is one backup stream, two backup streams, and the like. An analysis may then be performed to determine whether a combination of read block size and number of concurrent streams achieves a higher net aggregate throughput compared to successively determining a read block size and number of concurrent streams.

Embodiments of the invention may also account for other factors such as whether all of the source data (the savesets) are from the same source disk or from different source disks. The backup operation may identify which savesets are coming from which source disk. In one example, the savesets from each source disk may be segregated.

In one example, if the savesets happen to be from same source disk and it is determined that a maximum of X backup streams can be run from a particular source disk, then the number of backup streams per saveset is dynamically determined by dividing the maximum number of backup streams by the number of savesets residing on the same source disk.

For example, a source disk may provide a maximum throughput (an example of the threshold) when 16 backup streams are used and the optimum read block size is 1 MB. If a client is configured with 3 savesets residing on the source disk, then the backup streams are allocated by dividing the maximum number of backup streams by the number of savesets (16/3=5). As a result, the backup operation may provide or instantiate 5 backup streams per saveset using a read block size of 1 MB. Because the maximum throughput is associated with 16 concurrent streams, one of the savesets may be allocated a sixth backup stream using the same read block size.

By dynamically splitting the source data between the allocated backup streams or by dynamically generating and configuring the backup streams in this manner, the backup window can be reduced in part because the throughput is being maximized using the best read block size and the number of backup streams that achieves the maximum or best throughput.

In another example, the same client discussed in the previous example may have 2 savesets on a first source disk (disk1) and 1 saveset on a second source disk (disk2). If it is determined that 16 concurrent backup streams with a read block size of 1 MB is the best fit for disk1 and that 8 concurrent streams with a read block size of 4 MB is the best fit for disk2, then the source data is dynamically split to provide 8 backup streams per saveset. Thus, the two savesets on disk1 are each associated with 8 backup streams and the saveset on disk2 is associated with 8 backup streams. However, the read block size for disk1 is 1 MB and the read block size for disk2 is 4 MB.

In this manner, the backup operation can provide an effective dynamic split (allocate or associate the backup streams to specific savesets) for individually configured savesets that reside on different source disks. Dynamically splitting the source data into backup streams in this manner provides superior throughput that is based, in part, on the underlying storage architecture of the storage devices (disk1 and disk2 in the foregoing examples). When a saveset is backed up using, for example, 8 backup streams, the saveset is effectively divided into 8 smaller savesets. These 8 smaller savesets are related at the backup server such that the original saveset can be restored.

The following example illustrates how a client with 8 savesets can be backed up in a case where the savesets are dynamically split into smaller savesets (each corresponding to a backup stream) and in a case where the savesets are split into smaller savesets (each associated with a backup stream that is based on a static configuration). In one example, the source data or a saveset may not be split into smaller savesets when there is no improvement in throughput.

A static split for a client configured with 8 savesets and a parallelism of 32 (32 backup streams) will divide each saveset into 4 backup streams. This results in 32 overall backup streams. However, statically dividing the savesets of the client based on backup streams that are not dynamically configured does not ensure that performance is improved and does not ensure that throughput is maximized. In fact, the performance could worsen if 32 backup streams is a poor fit for the underlying source data and/or hardware.

Embodiments of the invention, before splitting the savesets into multiple backup streams, will determine the optimum number of save streams and the best fit read block size for each of those streams. As previously stated, if the backup operation determined that there is no value added by splitting the savesets into multiple savesets or multiple backup streams, then the backup operation may fallback to a traditional approach of backup and log message in an application log file.

In one example, a client may have 8 savesets each with an associated savepoint identified below:
/savepoint1
/savepoint2
. . .
. . .
. . .
/savepoint8

When performing a backup operation, the backup operation (e.g., the backup server, an agent or client operating on the client, or other component) may identify how many savesets reside on a particular source disk or filesystem. After determining the number of savesets, the backup operation may perform an optimize disk read process to determine an optimum read block size for that source disk or filesystem.

By way of example, the optimum read block size for a disk may be determined by selecting an initial read block size. This is done by performing read operations using different read block sizes and then determining the read block size that provides the best performance. It may be determined, based on I/O time considerations for example, that a read block size of 1 MB is the optimum read block size. If a parallel save or backup stream setting of the backup system is "ON" then the optimum number of backup streams may be determined. The number of concurrent read operations may be determined even in the parallel save stream setting is not ON.

This may be achieved by performing and comparing varying numbers of concurrent read operations in the context of the read block size. In one example the sample read operations may be increased to "2 concurrent 1 MB reads", "4 concurrent 1 MB reads", etc. In each case, the I/O time based on the number of concurrent reads is calculated or determined. The source data or the savesets may then be backed up using an optimum number of backup streams at an optimum read block size.

The following Table I illustrates an example of this process of determining a dynamic split or the dynamic determination of the number of backup streams for a particular disk or a particular saveset.

TABLE I

| Source Filesystem | Number of Savesets | Read Size | Two Concurrent Reads | Four Concurrent Reads | Eight Concurrent Reads | Dynamic Split |
|---|---|---|---|---|---|---|
| /FS1 Or source disk | 2 | 1 MB | 1 ms | 1.5 ms | 1.75 ms | 4 backup streams per Saveset |
| /FS2 Or source disk | 2 | 2 MB | 1 ms | 2 ms | 4 ms | No split Per Saveset |
| /FS3 Or Source disk | 4 | 4 MB | 1 ms | 1.5 ms | 2 ms | 2 backup streams per Saveset |

The number of parallel or concurrent backup streams can be based on the concurrent read time of the same block size and the amount of time taken to concurrently read the source data with the fixed read block size. In one example, if the concurrent read is not doubling or linearly increasing with >100% with respect to the previous read, then that is the number of concurrent streams that should be used for that particular filesystem or source data.

With reference to Table I above, the best fit for the filesystem FS1 that results in the best throughput seems to be 8 concurrent backup streams using a 1 MB read block size. Because the filesystem FS1 has 2 savesets, this results in 4 backup streams per saveset. The number of backup streams for the savesets on a file system of source disk can be dynamically determined during a backup operation.

If the dynamic split does not add any value to the backup process, then the savesets may not be split into multiple savestreams. This is the case for the filesystem FS2 as shown in Table I. Increasing the number of concurrent reads does not improve the overall throughput in the filesystem FS2. As a result, the filesystem FS2 can be backed up using or without using multiple backup streams.

The best fit for the filesystem FS3 appears to be 8 concurrent backup streams or 2 backup streams per saveset since the filesystem FS3 is configured with four savesets. The best fit can be determined by determining which combination achieves the best throughput for the system.

Dynamically splitting the source data into multiple backup streams based on, by way of example only, disk speed can ensure that the throughput of data is optimized. Embodiments of the invention thus include components or modules that allow the source data to be assessed prior to performing the backup operation or in the context of the backup operation. The assessment of the source data can ensure that the backup operation is improved. In addition, reasons can be provided to a user as to why dynamic streams are or are not implemented based on the assessment of the source data.

FIG. 1 illustrates an example of computing system where a backup operation backs up data using dynamically configured backup streams. Embodiments of the invention can protect data in multiple environments and may be implemented in clients that are physical machines, or virtual machines, with clients that include an agent process, or the like or in systems that are connected over networks.

FIG. 1 illustrates an example of a backup system 100 that may include a backup server 102, a client 112, and a storage 104. The backup system 100 may include multiple clients and an agent may be running on at least one of the clients. The backup server 102 may be configured to provide services to backup and/or recover data of the client 112. The backup server 102 may be responsible for managing all of the clients and scheduling backup operations for the clients. Backup operations can be initiated, however, in other ways. For example, the client 112 may initiate a backup operation. The backup server 102 may be responsible for controlling and managing multiple backup and/or recovery operations.

The client 112 may be responsible for hosting or providing access to the data to be backed up during a backup operation. The client 112 cooperates with the backup server 102 to backup the source data 118. The client 112 (or an agent 114 operating or running on the client 112) may be configured to send the data to be protected to the backup server 102 for storage.

In FIG. 1, the client 114 may be associated with storage 116. As previously stated, the client 112 and/or the storage 116 may be virtualized. By way of example, the storage 116 includes source data 118 that may be stored on one or more disks, illustrated as disks 120 and 122. Each disk may be associated with one or more savesets. A saveset is an example of data to be backed up and is an example of source data. A saveset may be all data on a disk or a portion thereof. A disk may therefore store multiple savesets. Each saveset may be associated with an entry point. In one example, a saveset is a portion of the source data. Depending on context, a backup may also be referred to as a saveset.

During a backup operation, the source data 118 (or portion thereof) may be copied to the storage 104. The backups 108 therefore includes backups of the source data 118 or portions thereof. The backups 108 more specifically include the savesets 110, which are copies of the savesets included in the source data 118. The backups 108 may be de-duplicated and may be incremental in nature. In other words, a backup operation may backup only data that has changed since the most recent backup.

When performing a backup operation, the source data or savesets on the disks 120 and/or 122 may be split into one or more backup streams or savestreams. Stated differently, the savesets may be divided into smaller savesets that are related to each other and each of the smaller savesets are backed up using one of the backup streams. Thus, each backup stream is associated with one of the smaller savesets. The division of the savesets into the backup streams is performed dynamically such that the throughput or data transfer rate is maximized per disk, per storage, or per client.

The backup server 102 may also maintain tracking structures 106. The tracking structures 106 may include, by way of example and not limitation, a client file index and a media database. The client file index may track the files that belong to a particular saveset. In one example, there is one client file index for each client. The media database may track a volume name, the location of each saveset fragment on the physical media, the backup dates of the savesets on the volume, and the file systems in each database. This information can be used during backup and/or restore operations. When a backup operation is performed, the backup server 102 can ensure that the smaller savesets associated backup streams are related such that the larger saveset can be recovered successfully. This information may be maintained in the tracking structures 106.

In one example, backing up the source data 118 or the data on the disks 120 and 122 to the storage 104 of the server 102 can include backing up the source data 118 in the storage 116 using multiple streams. The client 112, the agent 114, and/or the backup server 102 may be configured to identify an optimum disk read size and/or an optimal number of backup streams for the source data 118 on the disks 120 and 122.

The optimal number of backup streams may be determined for each disk independently. Alternatively, the number of backup streams may be determined for the client. The number of backup streams can be determined based by determining a read block size and by determining a concurrency factor. The concurrency factor reflects how many backup streams can be supported at the read block size such that throughput is maximized. Typically, the read block size is a factor of 2.

The read block size and the concurrency factor can be determined separately (determine the read block size and then determine the concurrency factor). The best fit read block size and concurrency factor can also be determined where various read block sizes are evaluated for each number of concurrent reads.

Figure 2:
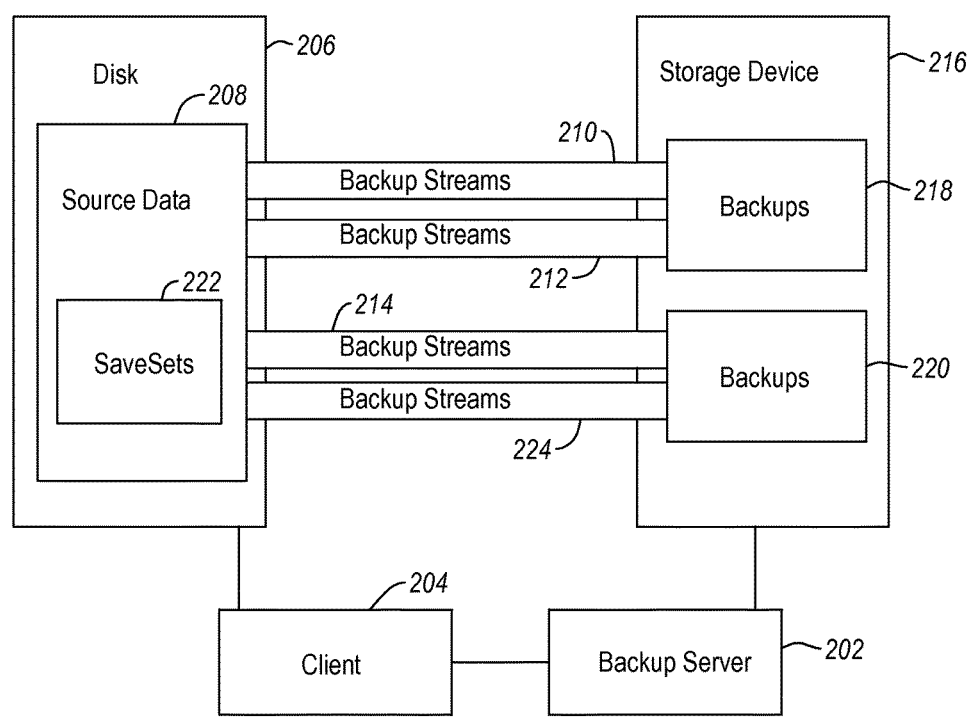
FIG. 2 illustrates an example of backup system that uses dynamically determined backup streams to backup data during a backup operation.

FIG. 2 illustrates and example of a backup operation where the source data is backed up by splitting the source data into multiple source streams. FIG. 2 illustrates a disk 206 associated with a client 204 and a backup server 202 associated with a storage 216. The client 204 cooperates with the backup server 202 to perform a backup operation such that the source data 208 (or portion thereof) is backed up as backups 218 and/or 220.

FIG. 2 also illustrates backup streams 210, 212, 214, and 224. The backup streams 210, 212, 214, and 224 are illustrative in nature and may each correspond to one or more backup streams. The specific number of backup streams in a given backup operation is determined dynamically. The description of Table I above provides additional examples of dynamically determining a number of backup streams and determining the configuration of those backup streams.

In this example, the source data 208 may include multiple savesets 222. The savesets 222 can be on a single disk or on multiple disks even though FIG. 2 illustrates that the source data 208 corresponds to a disk 206. The disk 206 could represent multiple disks. The dynamic splitting of the source data into backup streams (or the number of backup streams assigned to the source data) is based on the read block size and the number of streams that can be concurrently supported at the highest throughput, the number of savesets, and/or the number of disks, or the like. The read block size may be determined for each disk individually. The number of concurrent streams may also be determined for each disk individually. The configuration of the backup streams for one disk may differ from the configuration of the backup streams for other disks.

The read block size may be determined by performing reads of different sizes. Sample reads between, by way of example 64 KB to 8 MB may be performed (although smaller or larger block sizes could be performed). The read block size that provides the best I/O time is then used as the read block size for the savesets 222 or for the disk 206. As previously stated, a read block size may be determined for each disk. Next, the optimum number of concurrent backup streams is determined for each disk. This may be determined by performing different numbers of concurrent reads using the previously determined read block size. For example, a single read may be performed. Then, two concurrent reads at the same read block size. Then four concurrent reads at the same read block size. By measuring the corresponding time, the number of backup streams that results in the optimum or maximum throughput can be determined. The disk 206 may support X number of concurrent backup streams at the previously determined read block size. (e.g., 16 backup streams at 1 MB read block size).

The backup streams may then be allocated to the savesets by dividing the number of streams by the number of savesets. If the savesets 222 includes two savesets and the optimum number of streams is four, then each saveset would be associated with two backup streams. In this example, the backup streams 210 and 212 would be associated with the first saveset and the backup streams 214 and 224 would be associated with the second saveset. If the optimum number of backup streams is eight and there were 2 savesets in the savesets 222, then each saveset would be associated with four backup streams. In this case, the backup streams 210, 212, 214, and 224 would each represent two backup streams.

As previously stated, if the division of the optimum number of streams by the number of savesets is not even, any remainder backup streams could be allocated to any of the savesets. Alternatively, remainder backup streams could also not be used. For example, if the optimum number of savesets is 5 and there are two savesets, one of the savesets may have three backup streams while the other saveset has two backup streams.

Figure 3:
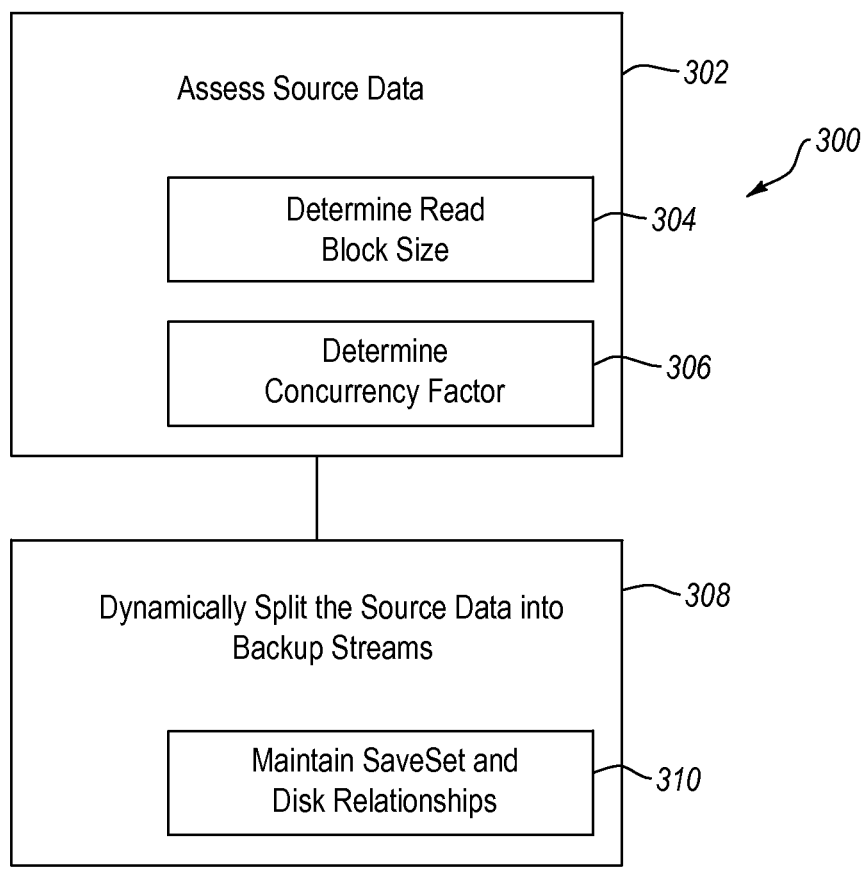
FIG. 3 illustrates an example of a method for performing a backup operation in a computing system.

FIG. 3 illustrates an example of a method for performing a backup operation. The method 300 for performing a backup operation often begins when the backup operation has been initiated. The backup server, the client, a user, or other module may initiate the backup operation.

During the backup operation, the source data is assessed in box 302. Assessing the source data can include determining a read block size in block 304 and determining a concurrency factor (e.g., number of concurrent reads or number of concurrent backup streams) in block 306. More specifically, an optimum read block size is determined in block 304 and an optimum number of backup streams is determined in block 306.

Determining a read block size in block 304 can include reading data from one of the savesets in the source data or from one of the disks of the client being backed up. These reads are examples of sample read operations that are used to determine the best block size that results in the fastest I/O time. The reads may be of different sizes. For example, sample reads may be performed at different block sizes (by way of example and not limitation, 64 KB-16 MB). These reads or samples can be expressed, in one example, as a metric (e.g., KB/s). Alternatively, the sample reads can also be considered in terms of I/O time for the data read operation. The read block size that provides the best performance is typically selected as the read block size for the backup operation.

As previously indicated, the read block size may be determined on a per disk basis. As a result, source data that is associated with two disks may involve two different read block sizes for the backup operations.

Once the read block size is determined, the concurrency factor is determined in block 306. This is procedure that is performed to determine how many concurrent read operations or backup streams provides the best throughput for a given device—such as a disk. In one example, data is optionally read with one read operation at the read block size and the time is recorded. Then, data may be read using two concurrent read operations at the read block size and the time is recorded. The data may then be read with 4 concurrent read operations at the read block size and the time is recorded. The data may then be read at 8 concurrent read operations at the read block size and the time is recorded. The data from these procedures can be compared and the number of concurrent reads that provides the best fit or the optimum throughput for the device is selected. An example is provided in Table I above. Although the number of concurrent reads are evaluated as a factor of two, embodiments of the invention could use any number of concurrent reads and the concurrency factor can be determined using other numbers of concurrent reads.

In block 308, the source data is dynamically split into backup streams. This may include dividing a saveset into smaller savesets. Each of the smaller savesets is backed up using one of the backup streams. The number of backup streams for a given device or disk is the optimum number of concurrent reads previously determined in block 306.

If there is only one saveset and it is determined that the optimum number of concurrent reads is 8, then the saveset is backed up using 8 backup streams at the previously determined read block size. If there are two savesets, then four backup streams are allocated to each saveset and each backup stream reads the data to be backed up at the optimum read block size.

When a saveset is backup up using multiple backup streams, the relationships between the smaller savesets and the larger saveset is maintained in box 310. The relationship between the saveset and the disk may also be maintained in box 310. This is often performed by the backup server. Once the backup streams are configured, the source data or the savesets are backed up to the backups maintained by the backup server in one example.

Figure 4:
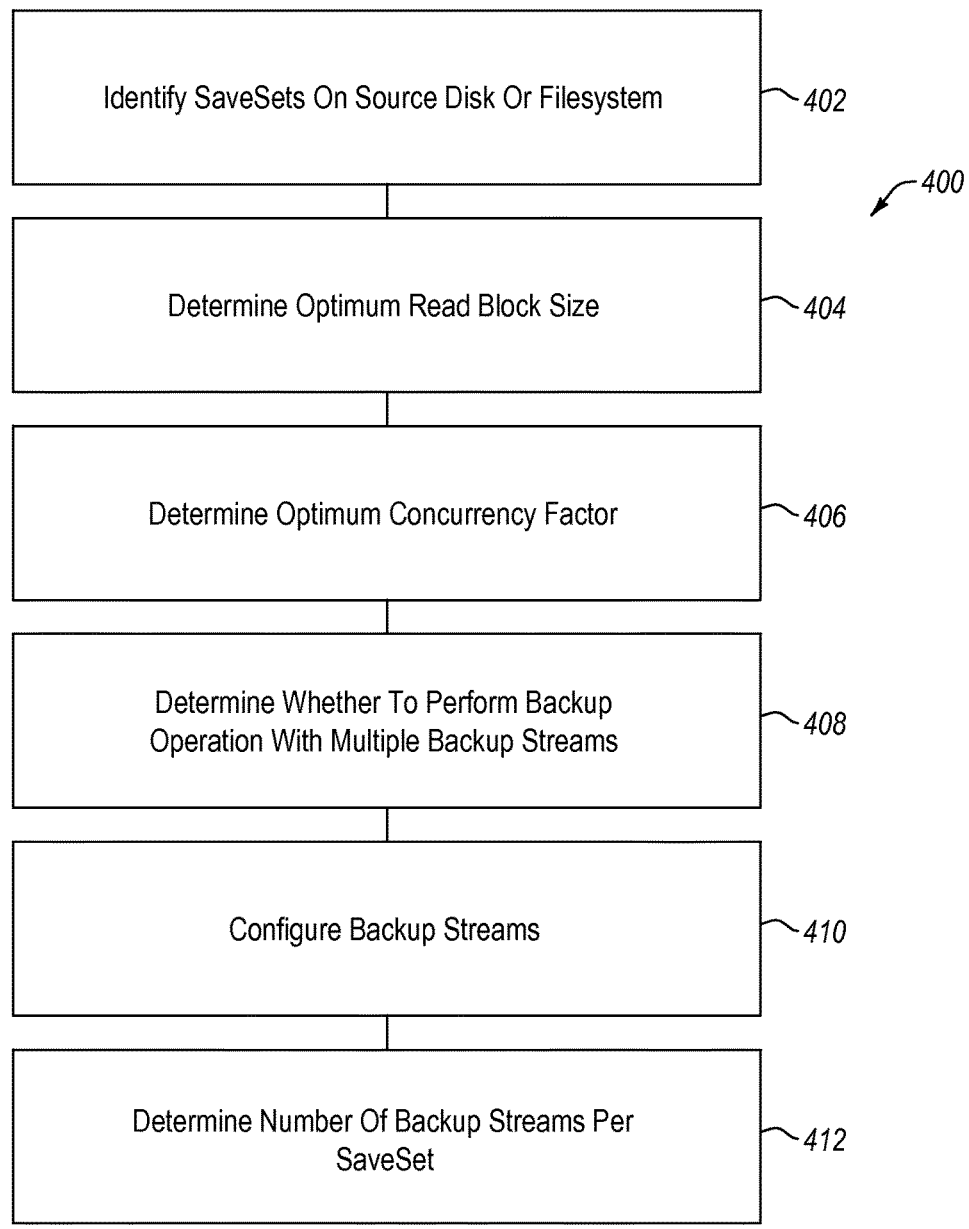
FIG. 4 illustrates another example of a method for performing a backup operation in a computing system.

FIG. 4 illustrates another example of a method for performing a backup operation in a computing system or environment. A method 400 may begin by determining a number of savesets on a source disk in block 402. When more than one source disk is involved, the number of savesets on each source disk is determined.

In block 404, an optimum read block size is determined. This may be achieved by performing sample read operations to determine the read block size that achieves the best performance (e.g., in terms of data rate and/or access time).

In block 406, an optimum number of concurrent read operations is determined. The number of concurrent read operations may be determined for each source disk.

In block 408, a decision is made regarding whether to perform the backup operation using multiple backup streams. If the analysis of the optimum read block size and the optimum number of concurrent read operations illustrates that backing up the savesets with multiple backup streams does not improve throughput, then the data is not split into smaller savesets and the saveset is simply backed up using, in effect, a single backup stream. However, the single backup stream may still use the optimum read block size if there was a read block size that provided superior performance compared to the other read block sized.

In block 410, the backup streams are configured. This may include setting the read block size for each source disk and/or the number of concurrent read operations for each source disk.

In block 412, the number of backup streams per save set is determined. As previously described, Table I above illustrates an example determining the read block size and the concurrency factor for a filesystem (e.g., a source disk). In block 412, the saveset may also split into smaller savesets and the backup operation is performed using the determined number of concurrent backup streams. Each backup stream is assigned to one of the smaller savesets.

As previously stated, the number of backup streams per saveset depends on the number of savesets that were identified on the source disk or file system in block 402. For example, if a source disk has 4 savesets, the optimum read block size is 2 MB and the concurrency factor is 16, then each saveset is split into four smaller savesets and each saveset is associated with four backup streams. The concurrency factor divided by the number of savesets yields, in this example, four backup streams per saveset.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup operation, the method comprising:
    assessing source data stored on a disk by performing different combinations of read block sizes and/or concurrency factors to determine a combination of a read block size and a concurrency factor that maximizes a throughput of the disk, wherein the read block size is determined for the disk and the concurrency factor is determined for the disk;
    determining a number of backup streams based on the concurrency factor;
    dynamically splitting the source data based on the read block size and the concurrency factor among the number of backup streams; and
    backing up the source data using the backup streams;
    wherein determining the concurrency factor by performing different numbers of concurrent read operations, the number of backup streams corresponds to the number of concurrent read operations that has a best throughput.

2. The method of claim 1, wherein the source data include a plurality of savesets, further comprising assigning an equal number of the backup streams to each of the savesets.

3. The method of claim 2, further comprising determining the read block size by performing sample read operations on the disk, wherein each sample read operation is associated with a time.

4. The method of claim 3, further comprising performing sample read operations on the disk of different read block sizes, wherein the read block size corresponds to the read block size that has the best time.

5. The method of claim 2, further comprising determining the read block size and the concurrency by performing sample read operations to determine a combination that has an optimum throughput, wherein an optimum combination includes the read block size and the number of backup streams.

6. The method of claim 1, wherein the source data includes a plurality of savesets, wherein dynamically splitting the source data includes dividing each of the savesets into multiple smaller savesets, wherein each of the smaller savesets is associated with one of the backup streams.

7. The method of claim 6, further comprising maintaining relationships between the source data and the disk in a backup storage device where the backup of the source data is stored.

8. A method for performing a backup operation, the method comprising:
    initiating a backup operation for one or more savesets stored on one or more disks;
    dynamically performing different combinations of read block sizes and/or concurrency factors to determine an optimum read block size and an optimum number of backup streams based on characteristics of at least the one or more disks; and
    backing up the one or more savesets using the optimum number of backup streams, wherein each of the savesets is associated with some of the backup streams, wherein a combination of the optimum read block size and the optimum number of backup streams maximizes a throughput of the one or more disks;
    wherein, for each of the one or more disks, the optimum number of backup streams is determined by performing different numbers of concurrent read operations and selecting the number of concurrent read operations that has the best throughput as the optimum number of backup streams.

9. The method of claim 8, wherein dynamically determining an optimum read block size and an optimum number of backup streams includes dynamically determining an optimum read block size and an optimum number of backup streams for each of the one or more disks.

10. The method of claim 8, wherein the backup streams for the savesets on each disk are determined by dividing the optimum number of backup streams by the number of savesets.

11. The method of claim 10, wherein remainder backup streams may be assigned to one of the savesets or remain unused during the backup operation.

12. The method of claim 9, wherein the optimum read block size is determined by performing sample read operations at different read block sizes and selecting the read block size that has the best metric as the optimum read block size.

13. The method of claim 8, wherein the optimum number of backup streams and the optimum read block size is determined after the backup operation has been initiated.

14. The method of claim 8, further comprising updating tracking structures to track backups of the one or more savesets.

15. A non-transitory storage medium having stored therein computer-executable instructions which, when executed by one or more hardware processors, perform a backup operation, wherein performing the backup operation comprises:
 assessing source data stored on a disk by performing different combinations of read block sizes and/or concurrency factors to determine a read block size and a concurrency factor, wherein the read block size is determined for the disk and the concurrency factor is determined for each disk associated with the source data independently, wherein a combination of the read block size and the concurrency factor increase a throughput of the source data to reduce a time required to perform the backup operation;
 determining a number of backup streams based on the concurrency factor for each disk, wherein the backup streams or each disk are configured with the corresponding read block size;
 determining a number of backup streams for each save set on each disk;
 backing up the source data using the backup streams;
 determining the read block size by performing sample read operations using different read block sizes on each disk, wherein the read block size for each disk is the read block size associated with the best metric based on time and data transferred for the different read block sizes; and
 determining the concurrency factor by performing different numbers of concurrent read operations on each disk, wherein the number of backup streams corresponds to the number of concurrent read operations that has a best throughput for each disk.

16. The method of claim 15, further comprising, for each disk, assigning an equal number of the backup streams to each of the savesets.

17. The method of claim 15, further comprising maintaining relationships between the source data and the disk in a backup storage device where the backup of the source data is stored.

* * * * *